(12) United States Patent
Huang et al.

(10) Patent No.: US 7,554,933 B2
(45) Date of Patent: *Jun. 30, 2009

(54) ECHO CANCELLATION DEVICE FOR FULL DUPLEX COMMUNICATION SYSTEMS

(75) Inventors: Chen-Chih Huang, Hsin-Chu Hsien (TW); Chih-Wen Huang, Kao-Hsiung Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 742 days.

This patent is subject to a terminal disclaimer.

(21) Appl. No.: 10/904,338

(22) Filed: Nov. 4, 2004

(65) Prior Publication Data

US 2005/0169163 A1    Aug. 4, 2005

Related U.S. Application Data

(63) Continuation-in-part of application No. 10/709,935, filed on Jun. 7, 2004, now Pat. No. 7,304,961.

(30) Foreign Application Priority Data

Jan. 9, 2004    (TW) .............................. 93100571 A

(51) Int. Cl.
   H04B 3/20    (2006.01)
   H04B 3/36    (2006.01)
   H04B 1/38    (2006.01)
   H04M 9/08    (2006.01)

(52) U.S. Cl. .................. 370/286; 370/293; 379/406.01; 455/570

(58) Field of Classification Search ......... 370/286–292; 379/406.01–406.16, 3; 455/570
See application file for complete search history.

(56) References Cited

U.S. PATENT DOCUMENTS

| 5,528,687 A | 6/1996 | Tanaka |
| 5,694,474 A | 12/1997 | Ngo et al. |
| 5,812,537 A | 9/1998 | Betts et al. |
| 5,960,077 A | 9/1999 | Ishii et al. |
| 6,278,785 B1 | 8/2001 | Thomasson |

(Continued)

FOREIGN PATENT DOCUMENTS

TW    318989    11/1997

(Continued)

OTHER PUBLICATIONS

"15MHz, BiMOS Operational Amplifier with MOSFET Input/CMOS Output," , Harris Semiconductor, Sep. 1998, pp. 1, 4, CA3130, CA3130A, No. 817.4., Harris Corporation 1998.

Primary Examiner—Tri H Phan
(74) Attorney, Agent, or Firm—Winston Hsu

(57) ABSTRACT

An echo cancellation apparatus of a transceiver in a full duplex communication system is disclosed. The full duplex communication system includes a transmitter section for transmitting a transmit signal and a receiver section for receiving a receive signal. The echo cancellation device includes an echo cancellation signal generator coupled to the transmitter section for receiving the transmit signal and for generating an echo cancellation signal according to the transmit signal, a load resistor and a parasitic capacitor of the transceiver; and a calculation module coupled to the transmitter section, the receiver section, and the echo cancellation signal generator for receiving the receive signal and for eliminating at least high frequency components of the echo signal.

30 Claims, 5 Drawing Sheets

U.S. PATENT DOCUMENTS

| | | |
|---|---|---|
| 6,373,908 B2 | 4/2002 | Chan |
| 6,775,529 B1 | 8/2004 | Roo |
| 6,947,478 B1 | 9/2005 | Hauptmann et al. |
| 6,965,578 B1 * | 11/2005 | Kappes ................ 370/286 |
| 6,980,644 B1 | 12/2005 | Sallaway et al. |
| 7,139,342 B1 * | 11/2006 | Phanse ................ 375/350 |
| 7,304,961 B2 * | 12/2007 | Huang et al. ............ 370/286 |
| 7,307,965 B2 * | 12/2007 | Huang et al. ............ 370/286 |
| 7,457,386 B1 * | 11/2008 | Phanse ................ 375/350 |
| 2002/0101983 A1 | 8/2002 | Lee |
| 2003/0169875 A1 * | 9/2003 | Lee et al. ............ 379/399.01 |
| 2003/0214903 A1 * | 11/2003 | Lee ................ 370/201 |
| 2005/0084003 A1 * | 4/2005 | Duron et al. ............ 375/221 |

FOREIGN PATENT DOCUMENTS

| | | |
|---|---|---|
| TW | 507433 | 10/2002 |

* cited by examiner

US 7,554,933 B2

ECHO CANCELLATION DEVICE FOR FULL DUPLEX COMMUNICATION SYSTEMS

CROSS REFERENCE TO RELATED APPLICATIONS

This is a continuation-in-part of U.S. application Ser. No. 10/709,935, filed 7 Jun., 2004, entitled "ECHO CANCELLATION DEVICE FOR A FULL DUPLEX COMMUNICATION SYSTEM" and which is included herein by reference.

BACKGROUND OF INVENTION

1. Field of the Invention

The present invention relates to a full duplex communication system, and more particularly, to an echo cancellation device in a full duplex communication system.

2. Description of the Prior Art

As technology advances, network applications have become more and more popular. Network bandwidth requirements are also increasing as the transmission speed of data transmission standards such as Ethernet have raised from 10/110 Mps to above 1 Gbps.

Each channel of a gigabit Ethernet system simultaneously performs transmitting and receiving operations. When the channel is transmitting, the signals received from the channel are affected by the transmission and this phenomenon is known as echo impairment. In order to reduce echo impairment in communication systems, an echo cancellation device is included within the transceiver. Please refer to FIG. 1 showing an equivalent circuit diagram of a line driver with a conventional echo cancellation device. The transmitter of the gigabit Ethernet system can be implemented to be a voltage mode transmitter which includes a line driver in the transmitter section 110. In FIG. 1, Rp is a matching resistor used for impedance matching, Zo is the channel's load, Vi is a transmit signal output from a transmitter section (line driver) 110, and Vo is an input signal of the twisted pair. The conventional echo cancellation device regards the channel's load Zo as a pure load resistor Re and the resistance of Rp is therefore equal to that of Re in order to match the impedance. From the circuit diagram shown in FIG. 1, the following formula can be obtained:

$$Vo = \frac{Zo}{Zo + Rp} Vi \quad (1)$$

The channel's load Zo is seen simply as the load resistor Re, thus Zo=Re. By substituting this relationship into formula (1), the following formula is obtained:

$$Vo = \tfrac{1}{2} Vi \quad (2)$$

From formula (2), it can be seen that the influence at a receiver section 310 and caused by the transmit signal Vi output from the voltage-driving transmitter section 110 is ½ Vi. The conventional echo cancellation device is employed to generate an echo cancellation signal corresponding to the transmit signal. As such, the echo cancellation signal is ½ Vi and is followed by a subtractor to cancel the effect caused by the transmit signal in order to achieve echo cancellation.

However, a parasitic capacitance Ce effect is unavoidable in practical implementation. If the effective output impedance of the channel is seen purely as the load resistor Re, the echo cannot be effectively reduced to the lowest level. In other words, the conventional echo cancellation device 106 can only reduce DC component of the echo but not eliminate echo residue at high frequencies.

SUMMARY OF INVENTION

It is therefore one of the objectives of the claimed invention to provide an echo cancellation device used in a full duplex communication system to solve the above-mentioned problem.

According to the claimed invention, an echo cancellation apparatus of a transceiver in a full duplex communication system is disclosed. The full duplex communication system includes a transmitter section for transmitting a transmit signal and a receiver section for receiving a receive signal. The echo cancellation device includes an echo cancellation signal generator coupled to the transmitter section for receiving the transmit signal and for generating an echo cancellation signal according to the transmit signal, a load resistor and a parasitic capacitor of the transceiver; and a calculation module coupled to the transmitter section, the receiver section, and the echo cancellation signal generator for receiving the receive signal and for eliminating at least high frequency components of the echo signal.

According to one embodiment of the present invention, the echo cancellation device further comprises an echo residue detector for detecting echo residue in the receive signal and for outputting a control signal to the echo cancellation signal generator in order to adjust the echo cancellation signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
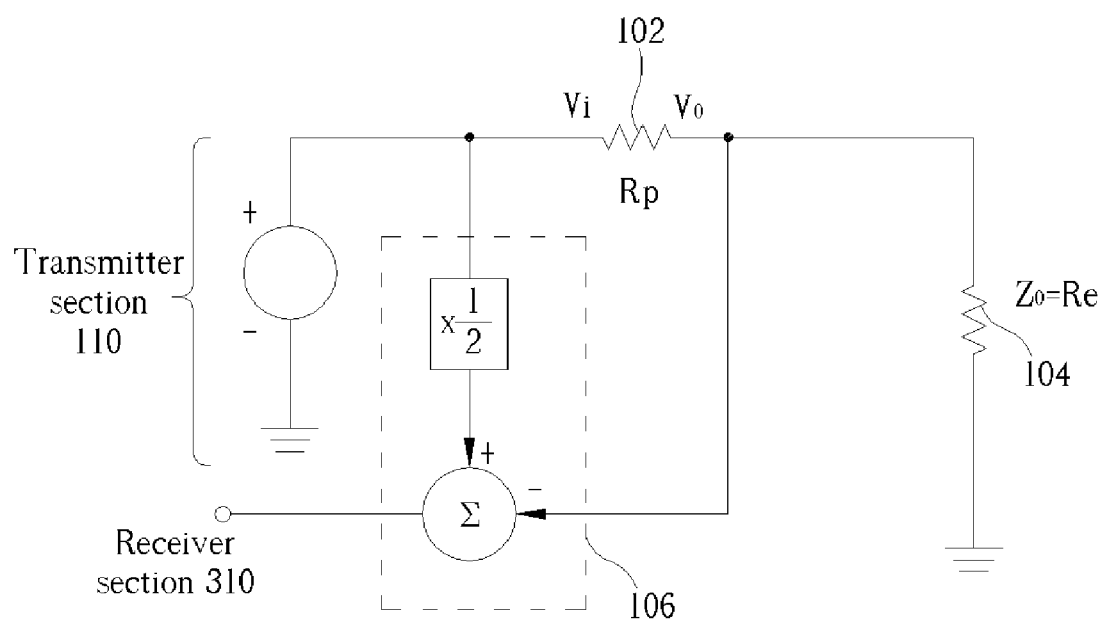
FIG. 1 is an equivalent circuit diagram of a line driver with a conventional echo cancellation device.
Figure 2:
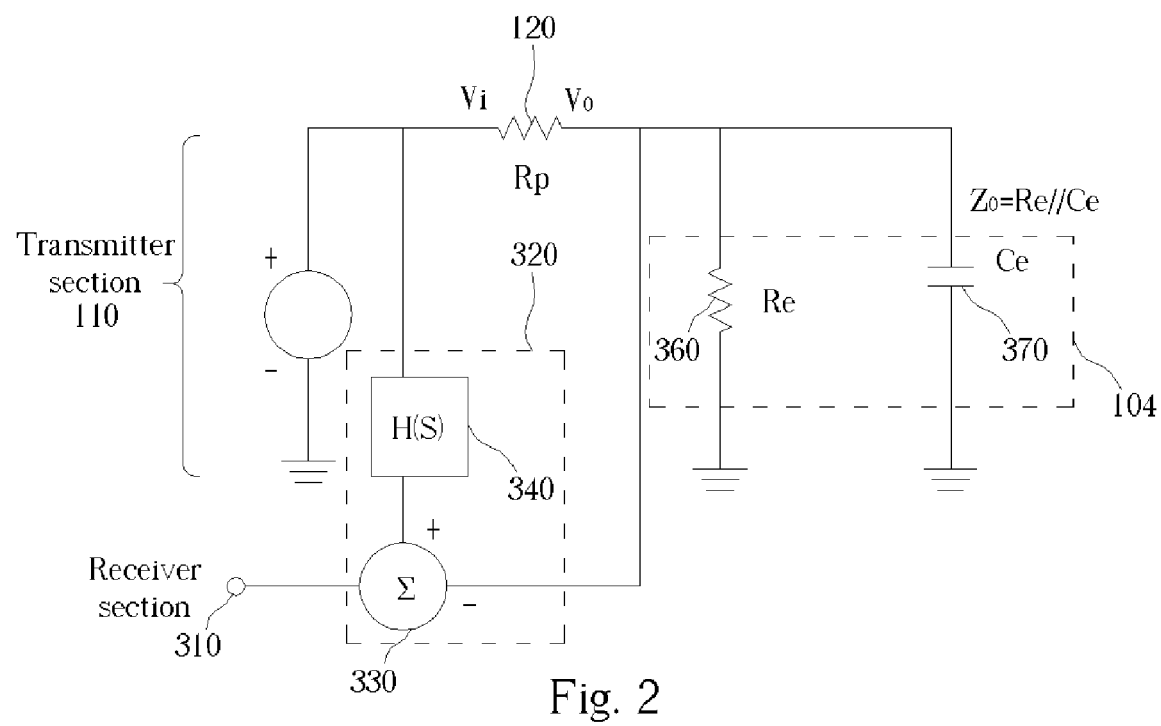
FIG. 2 is a schematic diagram of a line driver according to a first embodiment of the present invention.

Please refer to FIG. 2. FIG. 2 depicts a schematic diagram of a full-duplex Ethernet transmitter according to a first embodiment of the present invention. The transmitter of the gigabit Ethernet system can be implemented to be a voltage mode transmitter which includes a line driver in the transmitter section 110 in this embodiment. Since the unavoidable parasitic capacitance effect of practical implementations is considered in the first embodiment of the present invention, the equivalent output impedance Zo is modified to be a parallel connection of a load resistor Re 360 and a parasitic capacitor Ce 370. That means Zo=Re//Ce. Please note, the value of the load resistor Re 360 is determined from the matching resistor Rp 102 and the equivalent resistance of the channel. Substituting this relationship into formula (1) obtains a transfer function between Vo and Vi:

$$H(s) = \frac{Re}{Rp + Re + sReRpCe} \quad (3)$$

From formula (3), it can be seen that if the relation between Vo and Vi satisfies the transfer function H(s), then the echo can be completely cancelled.

As shown in FIG. 2, the echo cancellation device of the embodiment of the present invention comprises an echo cancellation signal generator 340 coupled to the transmitter section 110 for generating an echo cancellation signal according to the transmit signal, a load resistor and a parasitic capacitor of the transceiver base on the formula (3) shown above; and a calculation module 330 coupled to the transmitter section 110, the receiver section 310, and the echo cancellation signal generator 340 for outputting the receive signal according to the echo cancellation signal and a far-end signal. The echo cancellation signal generator 340 can be implemented using either analog means or digital means.

Figure 3:
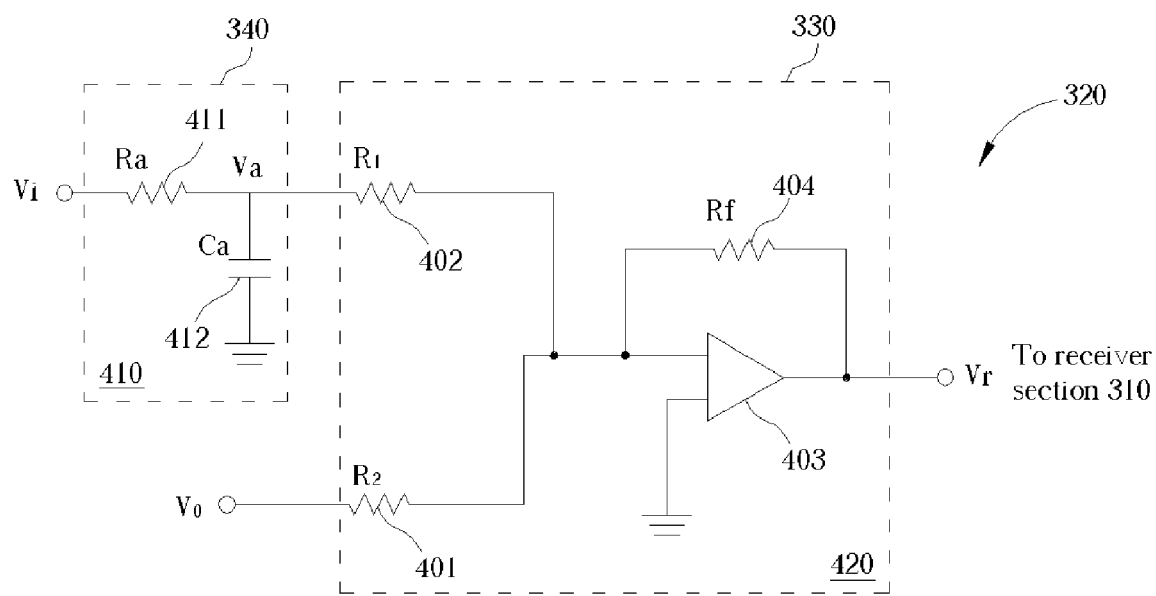
FIG. 3 is a schematic diagram of an analog echo cancellation signal generator of FIG. 2 according to the embodiment of the present invention.

One analog implementation means that can be employed to implement the echo cancellation signal generator 340 is an RC network low pass filter 410, as shown in FIG. 3. The RC network low pass filter 410 comprises a resistor Ra 411 and a capacitor Ca 412. The RC network low pass filter 410 is used for generating an echo cancellation signal Va according to the signal Vi. The RC network low pass filter 410 transmits the echo cancellation signal to an OP amplifier 403 via a resistor R1 402. The signal Vo is transmitted to the OP amplifier 403 via a resistor R2 401. A resistor Rf 404 has two terminals, one being coupled to the input end of the OP amplifier 403 and the other being coupled to the output end of the OP amplifier 403. The resistor Rf 404 controls the gain between the transmitter section and the receiver section 310. The echo cancellation device of the present invention utilizes the OP amplifier 403 to simultaneously perform low pass filtering and signal subtraction. According to FIG. 3, following formulas are obtained:

$$Va = \frac{R1}{Ra + R1 + sCaRaR1} Vi \quad (4)$$

$$Va \cdot \frac{Rf}{R1} + Vo \cdot \frac{Rf}{R2} = -Vr \quad (5)$$

By letting Vr=0 and combining the above-mentioned formulas (2), (4) and (5), the following formula is obtained:

$$\frac{1}{Ra + R1 + sCaRaR1} = \frac{-Re}{(Re + Rp + sCeReRp)R2} \quad (6)$$

Thus, the echo can be completely cancelled when the echo cancellation device of the present invention satisfies the two following formulas:

$$CaRaR1 = CeRpR2 \quad (7)$$

$$Ra + R1 = \left(\frac{Rp}{Re} + 1\right)R2 \quad (8)$$

According to the present invention, the effect of echo impairment at the receiver section 310 is minimized by utilizing the RC network low pass filter 410 to satisfy the formulas (7) and (8) and adjusting the capacitance of the capacitor Ca. The capacitor of FIG. 4 can be a metal-stacked-layer capacitor or a parasitic capacitor, and the resistor can be a MOS transistor. The resistance of the MOS transistor can be controlled by adjusting its gate voltage Vg.

Figure 4:
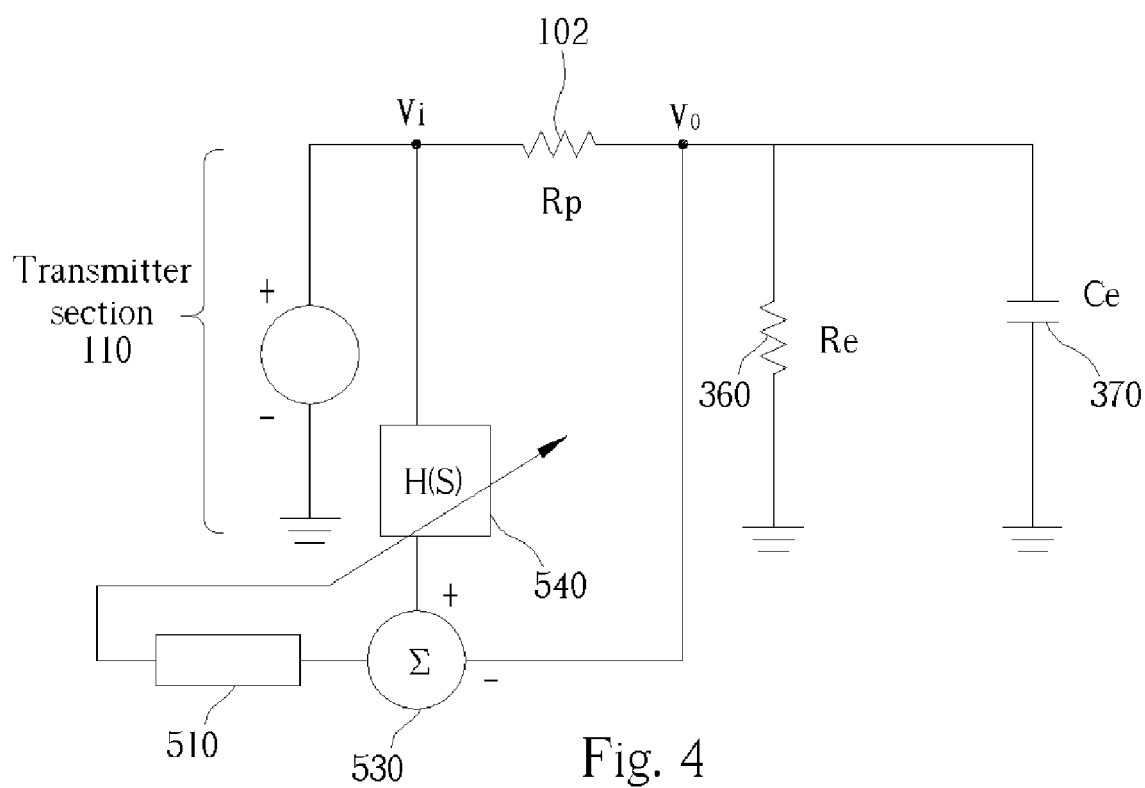
FIG. 4 is a schematic diagram of a line driver according to a second embodiment of the present invention.
Figure 5:
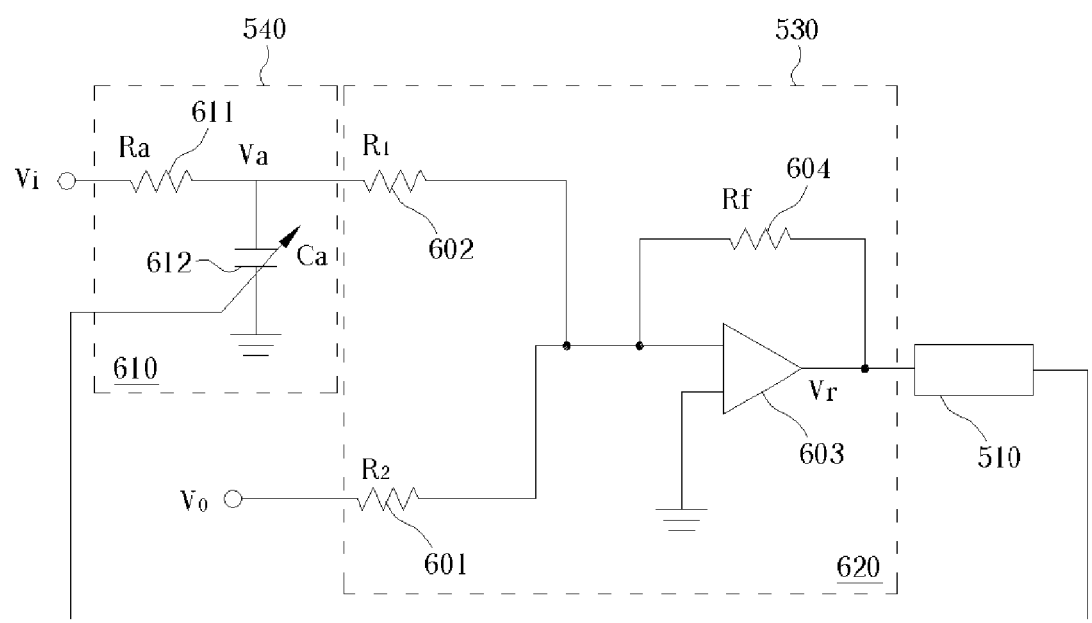
FIG. 5 is a schematic diagram of an analog echo cancellation signal generator of FIG. 4 according to the embodiment of the present invention.

FIG. 4 and FIG. 5 are block diagrams of the fast Ethernet device according to a second embodiment of the present invention. In practical implementations, the capacitance of the parasitic capacitor Ce 370, the resistance of the channel's equivalent resistor Re 360, and the impedance of the matching resistor Rp 102 are affected by the operating environment, temperature, manufacturing deviations, or similar variations. Therefore, the values will fluctuate and change when transmitting/receiving data. In order to more precisely eliminate the echo, in the second embodiment of the present invention, the echo cancellation device further comprises an echo residue detector 510 for detecting the echo residue at the receiver section. The echo residue detector 510 generates a control signal according to the detected echo residue and outputs the control signal to the echo cancellation signal generator 540 in order to form a feedback loop.

For example, if the echo cancellation signal generator 540 is a digital low pass filter as shown in FIG. 4, the echo cancellation device can utilize the control signal to dynamically adjust the finite impulse response (FIR) coefficients or the infinite impulse response (IIR) coefficients of the digital low pass filter according to the different characteristics of the circuit components and the network environment in order to obtain optimal echo cancellation performance. In another embodiment, if the echo cancellation signal generator 540 is an RC network low pass filter 610 as shown in FIG. 5, the control signal can be employed to dynamically adjust the capacitance of the capacitor to change the RC value of the RC network low pass filter 610 according to the different characteristics of the circuit components and the network environment in order to obtain optimal echo cancellation performance.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An apparatus for echo cancellation in a transceiver of a full duplex communication system, the transceiver comprising a transmitter section for transmitting a transmit signal and a receiver section for receiving a receive signal, the apparatus comprising:

an echo cancellation signal generator, coupled to the transmitter section and configured utilizing a resistance value of a load resistor and a capacitance value of a parasitic capacitor of the transceiver, for receiving the transmit signal and for generating an echo cancellation signal according to the transmit signal, the load resistor and the parasitic capacitor of the transceiver; and a calculation module coupled to the transmitter section, the receiver section, and the echo cancellation signal generator for receiving the receive signal and for canceling the echo of the receive signal.

2. The echo cancellation apparatus of claim 1, wherein the echo cancellation signal corresponds to the transmit signal.

3. The echo cancellation apparatus of claim 1, wherein the calculation module is for eliminating at least high frequency components of the echo signal.

4. The echo cancellation apparatus of claim 1, wherein the transceiver includes a voltage-mode transmitter section.

5. The echo cancellation apparatus of claim 4, wherein the voltage-mode transmitter section includes a line driver.

6. The echo cancellation apparatus of claim 1, wherein the echo cancellation signal generator is a filter.

7. The echo cancellation apparatus of claim 6, wherein the filter is a digital filter.

8. The echo cancellation apparatus of claim 6, wherein the filter is an RC network filter.

9. The echo cancellation apparatus of claim 6, wherein the filter is a low pass filter.

10. The echo cancellation apparatus of claim 1, wherein the calculation module is a subtractor.

11. The echo cancellation apparatus of claim 10, wherein the subtractor comprises a digital subtractor.

12. The echo cancellation apparatus of claim 1, wherein the echo cancellation device further comprises an echo residue detector for detecting echo residue in the receive signal and for outputting a control signal to the echo cancellation signal generator such that the echo cancellation signal generator adjusts the echo cancellation signal according to the control signal.

13. The echo cancellation apparatus of claim 12, wherein the echo cancellation signal generator adjusts the echo cancellation signal dynamically according to the control signal.

14. The echo cancellation apparatus of claim 12, wherein the echo cancellation signal generator includes an RC network filter and the echo cancellation signal is adjusted through adjusting the equivalent capacitance of the RC network filter.

15. The apparatus of claim 1, wherein the echo cancellation signal generator comprises an RC network filter which comprises a MOS transistor.

16. The apparatus of claim 15, wherein a control signal is employed to control the gate voltage of the MOS transistor.

17. An apparatus for echo cancellation device in a transceiver of a full duplex communication system, the transceiver comprising a transmitter section for transmitting a transmit signal and a receiver section for receiving a receive signal, the echo cancellation apparatus comprising:
    an echo cancellation signal generator, coupled to the transmitter section and configured utilizing a resistance value of a load resistor and a capacitance value of a parasitic capacitor of the transceiver, for receiving the transmit signal and for generating an echo cancellation signal according to the transmit signal, the load resistor and the parasitic capacitor of the transceiver;
    a calculation module coupled to the transmitter section, the receiver section, and the echo cancellation signal generator for receiving the receive signal and for canceling the echo of the receive signal; and
    an echo residue detector for detecting echo residue of the receive signal and for outputting a control signal to the echo cancellation signal generator in order to adjust the echo cancellation signal.

18. The echo cancellation apparatus of claim 17, wherein the echo cancellation signal corresponds to the transmit signal.

19. The echo cancellation apparatus of claim 17, wherein the echo cancellation signal is for eliminating at least high frequency components of the echo signal;

20. The echo cancellation apparatus of claim 17, wherein the transceiver includes a voltage-mode transmitter section.

21. The echo cancellation apparatus of claim 20, wherein the voltage-mode transmitter section includes a line driver.

22. The echo cancellation apparatus of claim 17, wherein the echo cancellation signal generator includes a digital filter.

23. The echo cancellation apparatus of claim 17, wherein the echo cancellation signal generator comprises an RC network filter.

24. The echo cancellation apparatus of claim 23, wherein the RC network filter comprises a resistor.

25. The echo cancellation apparatus of claim 23, wherein the RC network filter comprises a capacitor and the equivalent capacitance of the capacitor is controlled by the control signal.

26. The echo cancellation apparatus of claim 25, wherein the capacitor is a parasitic capacitor.

27. The echo cancellation apparatus of claim 23, wherein the RC network filter comprises a MOS transistor.

28. An apparatus for echo cancellation device in a transceiver of a full duplex communication system, the transceiver comprising a transmitter section for transmitting a transmit signal and a receiver section for receiving a receive signal, the echo cancellation apparatus comprising:
    an echo cancellation signal generator, coupled to the transmitter section for receiving the transmit signal and for generating an echo cancellation signal according to the transmit signal, a load resistor and a parasitic capacitor of the transceiver;
    a calculation module coupled to the transmitter section, the receiver section, and the echo cancellation signal generator for receiving the receive signal and for canceling the echo of the receive signal; and
    an echo residue detector for detecting echo residue of the receive signal and for outputting a control signal to the echo cancellation signal generator in order to adjust the echo cancellation signal;
    wherein the echo cancellation signal generator comprises an RC network filter which comprises a MOS transistor and the equivalent resistance of the MOS transistor is controlled by the control signal.

29. A method for eliminating an echo of a receive signal in a transceiver of a full duplex communication system, the transceiver comprising a voltage-mode transmitter section for transmitting a transmit signal and a receiver section for receiving a receive signal, the method comprising:
    receiving the transmit signal by the voltage-mode transmitter section;
    generating an echo cancellation signal through utilizing the transmit signal, a resistance value of a load resistor and a capacitance value of a parasitic capacitor of the transceiver;
    receiving the receive signal by the receiver section; and
    eliminating at least high frequency components of the echo signal according to the echo cancellation signal.

30. The method of claim 29, further comprising:
    detecting an echo residue of the receive signal and generating a control signal; and
    adjusting the echo cancellation signal according to the control signal.

* * * * *